(12) United States Patent
Murayama et al.

(10) Patent No.: US 9,330,353 B2
(45) Date of Patent: May 3, 2016

(54) ANTENNA MODULE

(71) Applicant: Murata Manufacturing Co., Ltd., Nagaokakyo-shi, Kyoto-fu (JP)

(72) Inventors: Hiromi Murayama, Nagaokakyo (JP); Yuya Dokai, Nagaokakyo (JP); Tsuyoshi Mukai, Nagaokakyo (JP); Kazuaki Higashibata, Nagaokakyo (JP); Masato Nomura, Nagaokakyo (JP); Noboru Kato, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/538,923

(22) Filed: Nov. 12, 2014

(65) Prior Publication Data

US 2015/0060555 A1    Mar. 5, 2015

Related U.S. Application Data

(63) Continuation of application No. PCT/JP2013/075005, filed on Sep. 17, 2013.

(30) Foreign Application Priority Data

Nov. 30, 2012  (JP) ................................ 2012-263051

(51) Int. Cl.
*G06K 13/00* (2006.01)
*G06K 19/077* (2006.01)
(Continued)

(52) U.S. Cl.
CPC ........ *G06K 19/07783* (2013.01); *G06K 19/073* (2013.01); *G06K 19/07749* (2013.01); *H01Q 1/2225* (2013.01); *H01Q 7/00* (2013.01); *H01Q 1/38* (2013.01)

(58) Field of Classification Search
CPC . B42D 15/10; G07F 7/1008; G06K 19/07749
USPC .................................................. 235/492, 487
IPC .... B42D 15/10; G07F 7/1008; G06K 19/07749
See application file for complete search history.

(56) References Cited

U.S. PATENT DOCUMENTS

2007/0205291 A1*  9/2007  Aramaki et al. .............. 235/492
2008/0149731 A1*  6/2008  Arai et al. .................... 235/492
(Continued)

FOREIGN PATENT DOCUMENTS

JP       10-240889 A     9/1998
JP     2000-295024 A    10/2000
(Continued)

OTHER PUBLICATIONS

Official Communication issued in International Patent Application No. PCT/JP2013/075005, mailed on Dec. 17, 2013.
(Continued)

*Primary Examiner* — Karl D Frech
(74) *Attorney, Agent, or Firm* — Keating & Bennett, LLP

(57) ABSTRACT

An antenna module includes a base including two opposing mounting surfaces, an antenna coil provided on or in the base so as to define an opening, the antenna coil having a shape that is symmetrical or substantially symmetrical with respect to a reference plane, and an IC chip and a plurality of electronic components mounted on one of the mounting surfaces and electrically coupled to the antenna coil, the IC chip and the electronic components being arranged inside the opening when viewed in plan from a normal direction of the mounting surface. At least two of the plurality of electronic components are arranged so as to be symmetrical or substantially symmetrical to each other with respect to the reference plane when viewed in plan from the normal direction.

20 Claims, 11 Drawing Sheets

(51) Int. Cl.
  *H01Q 7/00* (2006.01)
  *H01Q 1/22* (2006.01)
  *G06K 19/073* (2006.01)
  *H01Q 1/38* (2006.01)

(56) References Cited

U.S. PATENT DOCUMENTS

2011/0049249 A1  3/2011  Kato et al.
2012/0092222 A1  4/2012  Kato et al.

FOREIGN PATENT DOCUMENTS

| | | |
|---|---|---|
| JP | 2009-099752 A | 5/2009 |
| JP | 2010-063006 A | 3/2010 |
| JP | 2010-063081 A | 3/2010 |
| JP | 2012-094948 A | 5/2012 |
| WO | 2009/142068 A1 | 11/2009 |
| WO | 2009/142288 A1 | 11/2009 |
| WO | 2010/067706 A1 | 6/2010 |
| WO | 2011/002049 A1 | 1/2011 |

OTHER PUBLICATIONS

Official Communication issued in corresponding Japanese Patent Application No. 2014-092807, mailed on Jun. 15, 2014.
Official Communication issued in corresponding Japanese Patent Application No. 2014-092808, mailed on Jul. 1, 2014.
Official Communication issued in corresponding Japanese Patent Application No. 2014-092809, mailed on Jul. 1, 2014.

\* cited by examiner

F I G. 5A
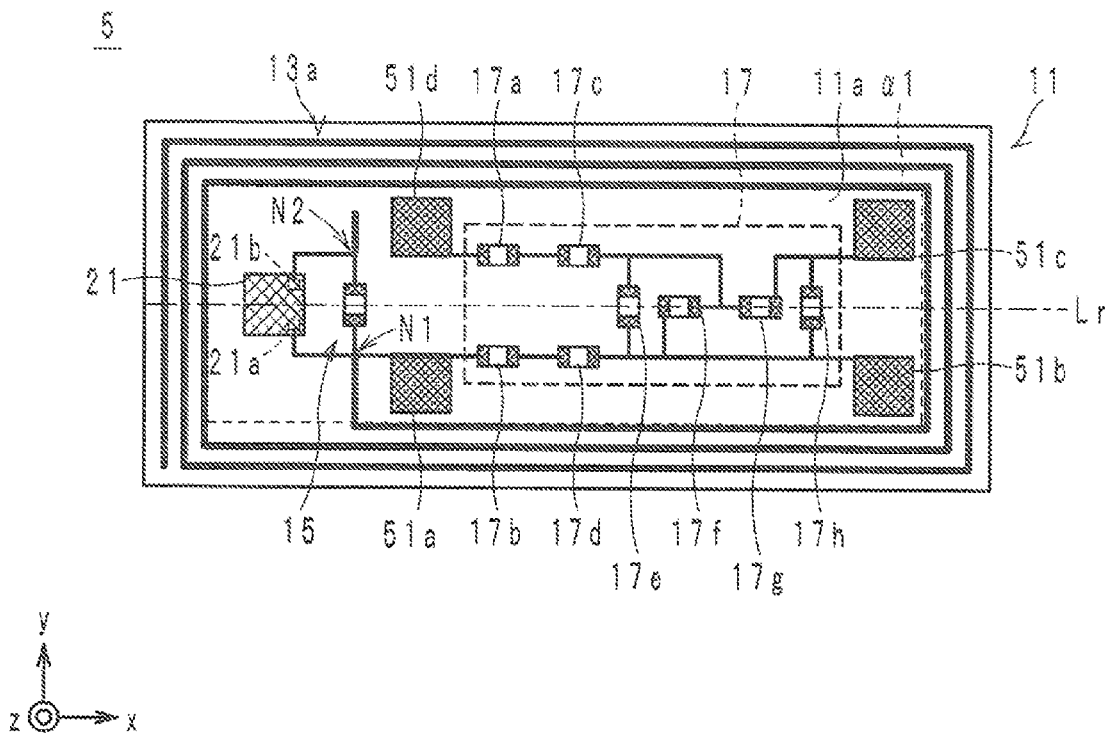
F I G. 5B
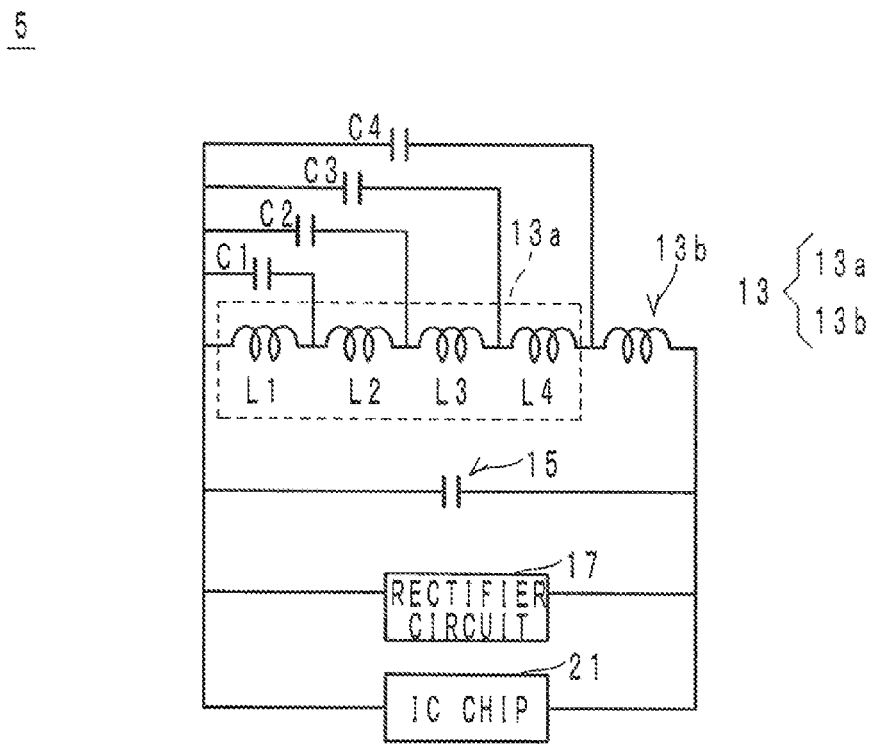

F I G. 6A
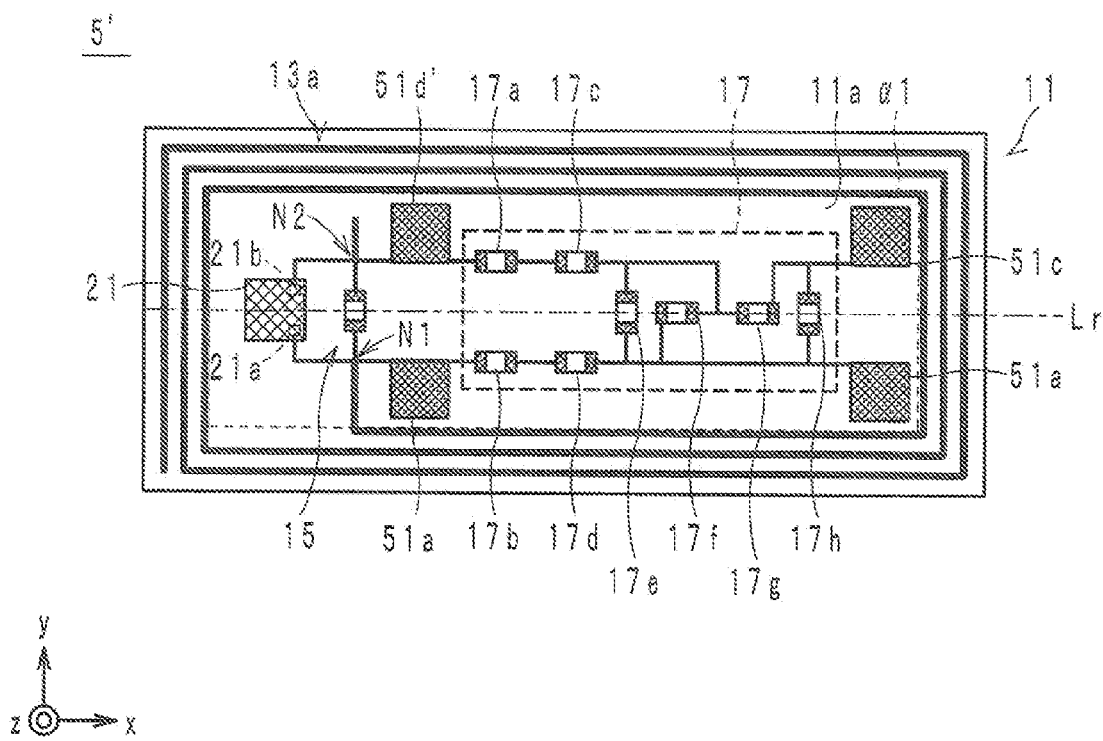
F I G. 6B
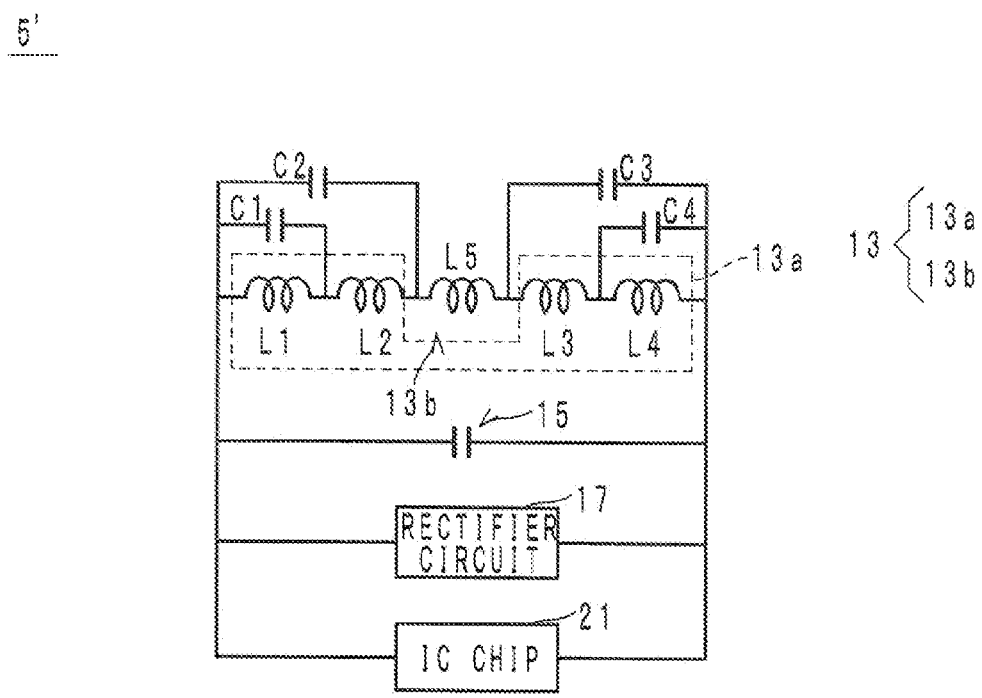

ANTENNA MODULE

This application is based on Japanese Patent Application No. 2012-263051 filed on Nov. 30, 2012 and International Application No. PCT/JP2013/075005 filed on Sep. 17, 2013, the entire contents of each of which is incorporated herein by reference.

BACKGROUND OF THE INVENTION

1. Field of the Invention

The present invention relates to antenna modules including an antenna coil and a plurality of electronic components provided on a base.

2. Description of the Related Art

Conventionally, an antenna module of this type is used as, for example, a passive-type RFID (Radio Frequency Identification) tag. For example, as disclosed in Japanese Patent Laid-Open Publication No. 10-240889, it includes a card antenna (also known as "antenna coil"), a rectifier circuit, a regulator, an IC, and a base sheet on which these components are mounted.

The card antenna is a spiral-shaped antenna coil formed on the principal surface of the base sheet. This card antenna is electromagnetically coupled to an antenna of a reader/writer unit (hereinafter, "RWU") which is provided outside the antenna module to produce an induced electromotive force. The rectifier circuit rectifies an AC voltage supplied from the card antenna and outputs a DC voltage to the regulator. The regulator converts the input DC voltage to a DC voltage which has a value suitable to driving of the IC, and supplies the resultant DC voltage to the IC. The IC is driven with the DC voltage supplied form the regulator.

In many of the antenna modules, the antenna coil used has a relatively large opening, and other electronic components are arranged in this opening portion. In this case, there is a probability that magnetic force lines generated from the antenna coil are blocked by the electronic components due to the arrangement of the electronic components. As a result, there is a problem that the characteristics of the antenna module (for example, directivity and communication distance) deteriorate.

SUMMARY OF THE INVENTION

Accordingly, preferred embodiments of the present invention provide an antenna module that prevents deterioration of the characteristics.

An antenna module according to a preferred embodiment of the present invention includes a base including two opposing mounting surfaces; an antenna coil provided on or in the base so as to define an opening, the antenna coil having a shape that is symmetrical or substantially symmetrical with respect to a reference plane; and an IC chip and a plurality of electronic components mounted on one of the mounting surfaces and electrically coupled to the antenna coil, the IC chip and the electronic components being arranged inside the opening when viewed in plan from a normal direction of the mounting surface. At least two of the plurality of electronic components are arranged so as to be symmetrical or substantially symmetrical to each other with respect to the reference plane when viewed in plan from the normal direction.

An antenna module according to another preferred embodiment of the present invention includes a base; an antenna coil provided on or in the base; an IC chip electrically coupled to the antenna coil and provided on the base; and a terminal electrode coupled to the IC chip and provided on the base so as to be capacitively coupled to the antenna coil.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5A is a top view showing a configuration of a RFID tag according to a second preferred embodiment of the present invention.

FIG. 5B is an equivalent circuit diagram of the RFID tag of FIG. 5A.

FIG. 6A is a top view showing a configuration of a variation of the RFID tag of the second preferred embodiment of the present invention.

FIG. 6B is an equivalent circuit diagram of the RFID tag of FIG. 6A.

DETAILED DESCRIPTION OF THE PREFERRED EMBODIMENTS

Hereinafter, antenna modules according to preferred embodiments of the present invention will be described in detail with reference to the drawings.

As a preliminary matter, the x-axis, y-axis, and z-axis which are shown in some drawings are described. The x-axis, y-axis, and z-axis are perpendicular to one another and represent the left-and-right direction, the front-and-rear direction, and the thickness direction of the antenna module.

Figure 1:
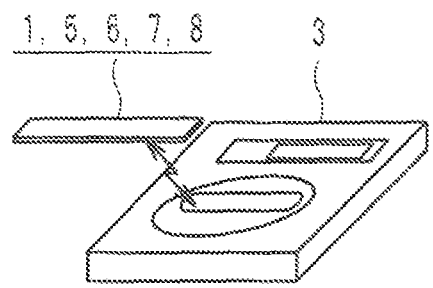
FIG. 1 is a schematic diagram showing a configuration of a RFID system including an antenna module according to a preferred embodiment of the present invention.

In FIG. 1, an RFID system preferably uses the 13.56 MHz band, for example. The RFID system includes RFID tags 1, 5, 6, 7 and 8 according to the first to fifth preferred embodiments of the present invention, and a reader/writer unit (hereinafter, "RWU") 3 configured to write and read data in/from these RFID tags.

Figure 2:
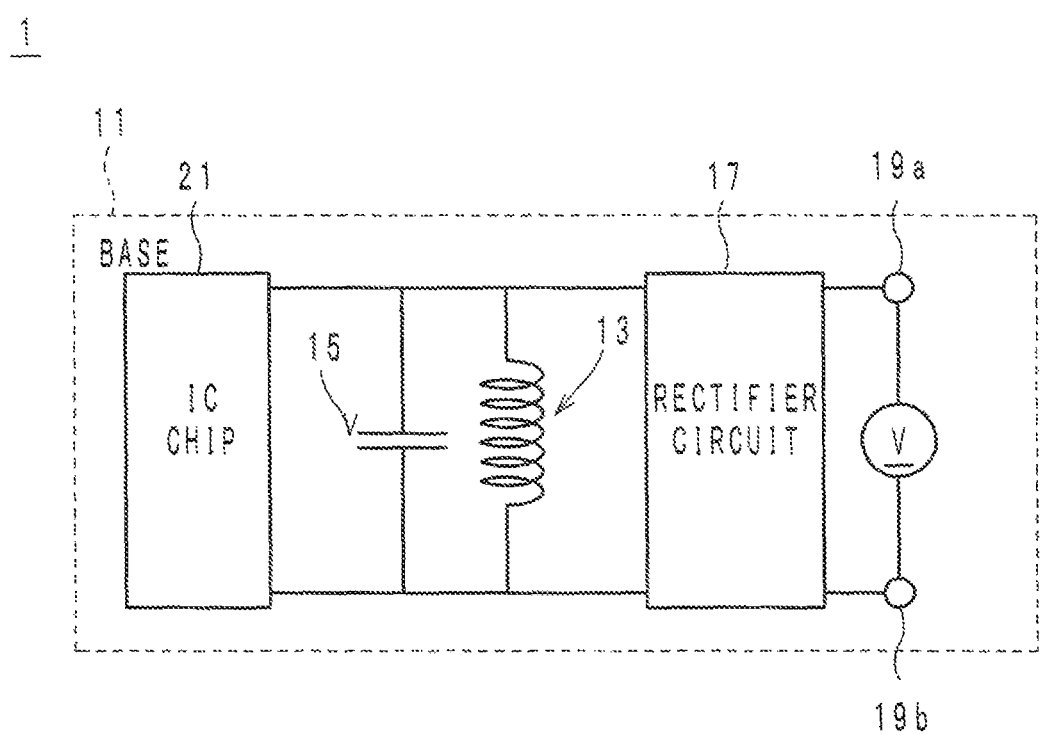
FIG. 2 is a block diagram showing a general configuration of a RFID tag (antenna module) according to a first preferred embodiment of the present invention.

An RFID tag 1 is one example of the antenna module according to a first preferred embodiment of the present invention. As shown in FIG. 2, the RFID tag 1 preferably includes a base 11, an antenna coil 13, a capacitor 15, a rectifier circuit 17, and an IC chip 21. The antenna coil 13, the capacitor 15, the rectifier circuit 17, and the IC chip 21 are electrically coupled together by a wiring pattern.

Figure 3A:
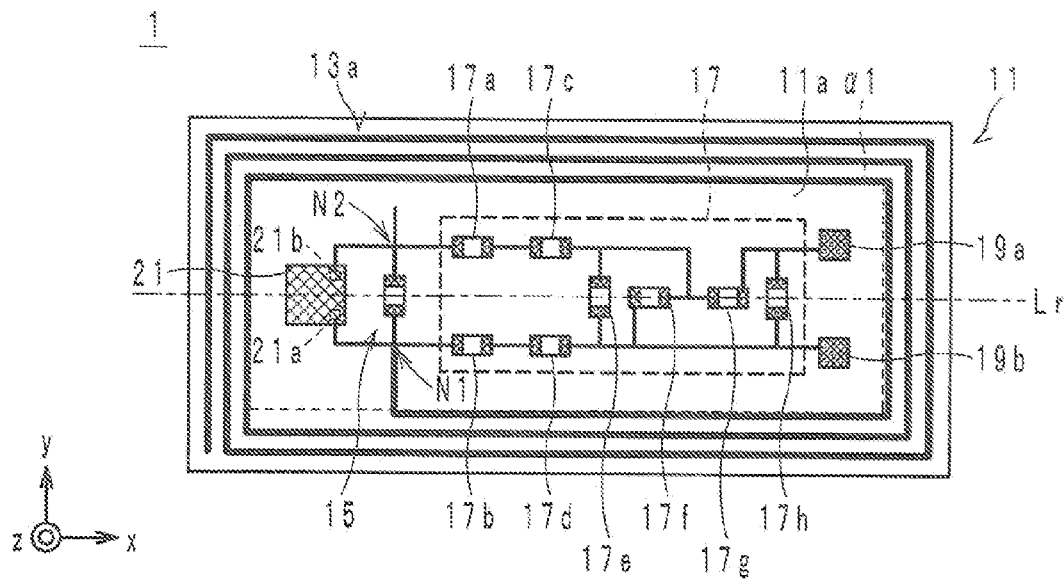
FIG. 3A is a top view showing a configuration of the RFID tag of FIG. 2.
Figure 3B:
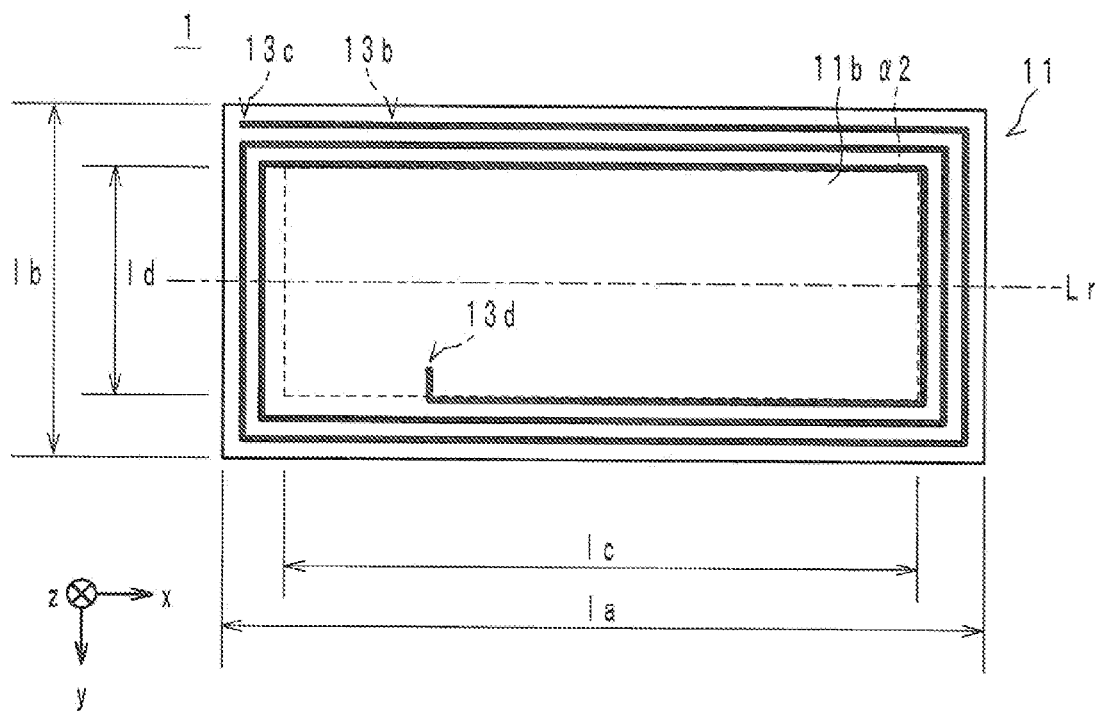
FIG. 3B is a bottom view showing a configuration of the RFID tag of FIG. 3A.

The base 11 is made of a resin material which is electrically insulative and flexible. A typical example of the resin material is a resin film of polyethylene telephthalate (PET), polyvinyl chloride (PVC), polyimide, polycarbonate, liquid crystal polymer (LCP), or an epoxy resin. In the present preferred embodiment, the base 11 is a sheet which has a rectangular or substantially rectangular shape when viewed in plan from the z-axis direction. Therefore, as shown in FIG. 3A and FIG. 3B, the base 11 includes mounting surfaces 11a, 11b which are parallel or substantially parallel to the xy plane (i.e., the mounting surfaces 11a, 11b oppose each other in the z-axis direction). The first and second mounting surfaces preferably have, for example, a length la of about 9.1 mm in the x-axis direction and a length lb of about 26 mm in the y-axis direction. As described herein, in the present preferred embodiment, the base 11 has flexibility. Due to this flexibility, the RFID tag 1 is easily and securely adhered along a curved surface. Note that the base 11 may be made of a rigid (i.e., non-flexible) resin material. Using a rigid material enables protection of joining portions between the base 11 and electronic components mounted thereon.

The antenna coil 13 includes conductor patterns 13a, 13b which are preferably formed by printing or the like on the mounting surfaces 11a, 11b and via conductors 13c, 13d. The conductor patterns 13a, 13b and the via conductors 13c, 13d are made of a metal such as copper, for example.

Hereinafter, opening regions α1, α2 (shown by broken lines) of the mounting surfaces 11a, 11b are described prior to detailed description of the conductor patterns 13a, 13b. In the present preferred embodiment, the opening region α1 has a rectangular or substantially rectangular shape when viewed from the z-axis direction (i.e., the normal direction of the mounting surface 11a) and has a length lc (lc<la) in the x-axis direction and a length ld (ld<lb) in the y-axis direction. Note that if the antenna coil 13 is provided across the mounting surfaces 11a, 11b and the external shapes of the openings of the mounting surfaces 11a, 11b are not identical when viewed in plan from the z-axis direction, the overlapping region of these opening regions is considered as the opening region α1, α2.

A plane which generally passes through the y-axis center of the opening region α1 and which is parallel to the zx plane is referred to as imaginary reference plane Lr. Here, the reference plane Lr may pass within a range of about ±10% of the distance from the y-axis center of the opening region α1 to the outer edges of the opening region α1. The opening region α1 has a symmetrical or substantially symmetrical shape, within manufacturing tolerances, with respect to the reference plane Lr. The shortest distances from respective sides of the opening region α1 to the perimeter edges of the mounting surface 11a are equal to one another.

The opening region α2 substantially overlaps the opening region α1 when viewed in plan from the z-axis direction.

The conductor pattern 13a is a linear conductor pattern formed at the perimeter edges of the mounting surface 11a and has a generally symmetrical or substantially symmetrical shape with respect to the reference plane Lr. Firstly, node N1 is defined. The node N1 is a connecting portion in the wiring pattern at which a terminal electrode 21a of the IC chip 21 and one terminal of the capacitor 15 are coupled together. The conductor pattern 13a has one end at the position of the node N1 and extends from this position in the negative direction of the y-axis to the perimeter edge of the opening region α1. From this position, the conductor pattern 13a circles anti-clockwise, for example, over the drawing sheet of FIG. 3A, around the center point of the mounting surface 11a so as to extend parallel or substantially parallel to the perimeter edges of the mounting surface 11a. In addition to the above, the conductor pattern 13a circles from the perimeter edge of the opening region α1 toward the perimeter edge of the base 11 while the distance from the center point of the mounting surface 11a increases. And, the conductor pattern 13a terminates at a corner of the base 11. Hereinafter, this terminal portion is referred to as the other end of the conductor pattern 13a.

The conductor pattern 13b is a linear conductor pattern arranged along the perimeter of the mounting surface 11b and has a symmetrical or substantially symmetrical shape with respect to the reference plane Lr. More specifically, the conductor pattern 13b circles clockwise, for example, over the drawing sheet of FIG. 3B, around the center point of the mounting surface 11b, from a position on the xy plane which is substantially coincident with the other end of the conductor pattern 13a, so as to extend parallel or substantially parallel to the perimeter edges of the mounting surface 11b. In addition to the above, the conductor pattern 13b circles from the perimeter edge toward the center point of the mounting surface 11b while the distance from the center point of the mounting surface 11b decreases. And, the conductor pattern 13b bends on the perimeter edge of the opening region α2 and extends toward the reference plane Lr to terminate. Hereinafter, this terminal portion is referred to as the other end of the conductor pattern 13b.

The via conductor 13c penetrates through the base 11 and electrically couples the other end of the conductor pattern 13a and one end of the conductor pattern 13b.

Here, as shown in FIG. 3A, the connecting portion of a terminal electrode 21b of the IC chip 21 and the other terminal of the capacitor 15 is referred to as node N2. From the node N2, the wiring pattern extends in the positive direction of the y-axis over the mounting surface 11a. This wiring pattern terminates at a position on the xy plane which is coincident with the terminal position of the conductor pattern 13b. The via conductor 13d penetrates through the base 11 and electrically couples the other end of the conductor pattern 13b and the terminal end of the wiring pattern.

The capacitor 15 is an example of the electronic component. As clearly seen from the above, the antenna coil 13 and the capacitor 15 are coupled in parallel to the terminal electrodes 21a, 21b of the IC chip 21 (see FIG. 2) so as to define a parallel resonance circuit. The resonant frequency of this circuit preferably is within the frequency band of the RFID system (for example, 13.56 MHz band).

In the present preferred embodiment, the capacitor 15 preferably is a surface-mounted capacitor and is mounted on the mounting surface 11a. More specifically, the capacitor 15 is arranged inside the opening region α1 such that the external shape of the capacitor 15 is symmetrical or substantially symmetrical with respect to the reference plane Lr when viewed in plan from the z-axis direction.

The rectifier circuit 17 includes, for example, a diode bridge including a plurality of diodes, and capacitors, resistors, etc. The rectifier circuit 17 is configured to rectify an alternating induced electromotive force produced at the opposite ends of a resonance circuit which includes the antenna coil 13, the IC chip 21, and the capacitor 15. The rectifier circuit 17 that has such a configuration may be realized by a well-known circuit configuration which includes a plurality of surface-mounted electronic components. However, the rectifier circuit 17 includes a plurality of electronic components containing metal materials and magnetic materials. The plurality of electronic components include at least two electronic components of the same type. In the example of FIG. 3A, the electronic components 17a, 17b preferably are of the same type, and the electronic components 17c, 17d preferably are of the same type. The electronic components 17a, 17b are, for example, capacitor elements which preferably have the same size. The electronic components 17c, 17d are, for example, resistor elements which preferably have the same size.

The other elements shown in FIG. 3A include electronic components 17e to 17h. The electronic components 17e to 17h are of different types.

The electronic components 17a to 17h are mounted on the mounting surface 11a. More specifically, the electronic components 17a, 17b are arranged inside the opening region α1 so as to be symmetrical or substantially symmetrical to each other with respect to the reference plane Lr when viewed in plan from the z-axis direction. The electronic components 17c, 17d are also arranged in the same positional relationship as the electronic components 17a, 17b.

The electronic components 17a to 17d are arranged closer to the reference plane Lr than to the conductor pattern 13a. The electronic components 17e to 17h are arranged inside the opening region α1 such that the external shape of each of the electronic components is symmetrical or substantially symmetrical with respect to the reference plane Lr when viewed in plan from the z-axis direction, as is the above-described capacitor 15.

Terminal electrodes 19a, 19b are provided on the mounting surface 11a, at the tip ends of one and the other of two wiring patterns drawn out from the rectifier circuit 17. The terminal electrodes 19a, 19b are configured to, for example, couple a voltage measuring circuit in parallel to the rectifier circuit 17 as shown in FIG. 2.

The IC chip 21 is mounted to the mounting surface 11a by flip-chip bonding, for example. The terminal electrodes 21a, 21b of the IC chip 21 are coupled to a resonance circuit which includes the antenna coil 13 and the capacitor 15, by the wiring patterns.

The IC chip 21 also includes metal materials, and the like, as do the electronic components 17a to 17h. The IC chip 21 is arranged inside the opening region α1 such that the external shape of the IC chip 21 is symmetrical or substantially symmetrical with respect to the reference plane Lr when viewed in plan from the z-axis direction.

The IC chip 21 operates with an AC voltage supplied from the resonance circuit which includes the IC chip 21, the capacitor 15, and the antenna coil 13.

Next, an operation of the RFID tag 1 that has the above-described configuration at the time of signal reception is described. In the RFID tag 1, when an alternating magnetic field from the RWU 3 penetrates the antenna coil 13, an induced electromotive force is produced at the opposite ends of the antenna coil 13 (i.e., the node N1 and N2). Data from the RWU 3 is input to the IC chip of the RFID tag 1, and the data received from the RWU 3 is demodulated and written in an internal memory of the IC chip 21. On the other hand, the induced electromotive force produced at the opposite ends of the antenna coil is converted to a digital signal by the rectifier circuit 17. In this way, it is possible to detect input of data to the IC from an external circuit other than the RWU 3 via the terminal electrodes 19a, 19b.

Next, an operation of the RFID tag 1 at the time of data transmission from the RFID tag 1 to the RWU 3 is described. Also in this case, in the RFID tag 1, the IC chip 21 is driven by the above-described driving voltage. A carrier wave is digitally modulated with data to be transmitted such that a high frequency signal of 13.56 MHz band, for example, is produced. The IC chip 21 outputs the produced high frequency signal to the resonance circuit. When the high frequency signal is input, the resonance circuit resonates to produce an alternating magnetic field. Via this alternating magnetic field, the data is transmitted to the RWU 3. Basic operation of the RWU 3 at the time of data reception is the same as the operation of the RFID 1 at the time of data reception, and therefore, the description thereof is herein omitted.

Figure 4:
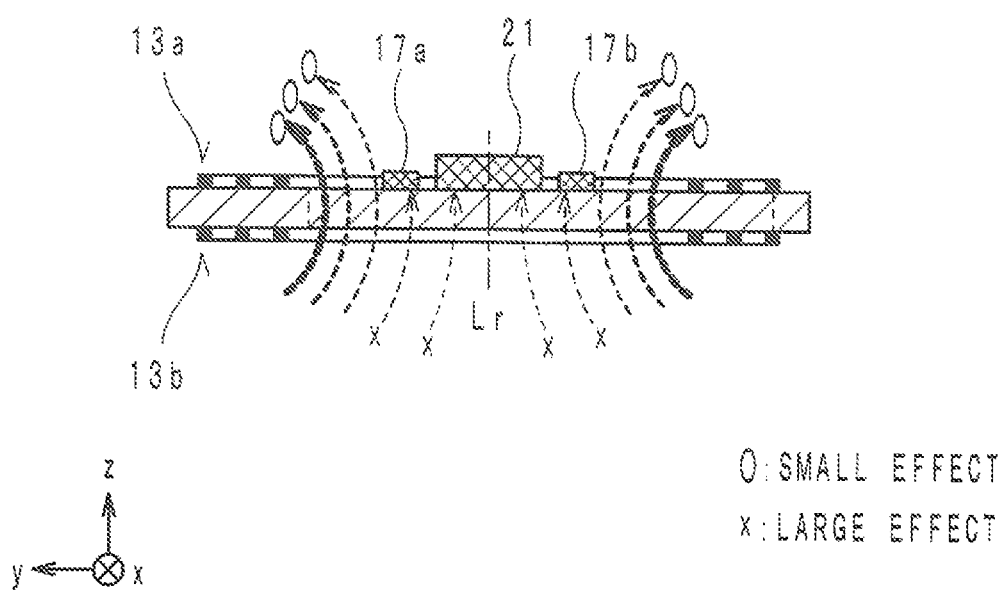
FIG. 4 is a schematic diagram showing the functions and effects of the RFID tag of FIG. 3A.

Next, the functions and effects of the RFID tag 1 are described. For example, at the time of data transmission, an alternating magnetic field produced by the antenna coil 13 is strong near the conductor patterns 13a, 13b and becomes weaker at a position closer to the reference plane Lr as shown in FIG. 4. Here, in FIG. 4, examples of alternating magnetic field components are shown by broken lines, and the magnetic field strength is indicated by the width of the lines.

As previously described, when the electronic components 17 and the IC chip 21 are placed in an alternating magnetic field, they cause effects on the strength and direction of the alternating magnetic field. The electronic components 17a to 17h and the IC chip 21 are arranged on the base 11 such that these effects are reduced as small as possible. Specifically, the electronic components 17a, 17b of the same type are arranged inside the opening region α1 so as to be symmetrical or substantially symmetrical to each other with respect to the reference plane Lr when viewed in plan from the z-axis direction. The same applies to the electronic components 17c, 17d. Due to this arrangement, the symmetry of the distribution of the magnetic field strength is maintained, and the non-directivity of the antenna coil 13 is maintained.

Comparing the direct distance d1 between the electronic component 17a and the conductor pattern 13a and the direct distance d2 between the electronic component 17a and the reference plane Lr, d2<d1 holds. The same positional relationship also applies to the other electronic components 17b to 17d. With this arrangement, deterioration in strength of the magnetic field produced by the antenna coil 13 is reduced to be as small as possible.

The electronic components 17e to 17h and the IC chip 21 are arranged inside the opening region α1 such that the external shape of each of the electronic components 17e to 17h and the IC chip 21 is symmetrical or substantially symmetrical with respect to the reference plane Lr when viewed in plan from the z-axis direction. In this way, the electronic components 17e to 17h and the IC chip 21 are arranged on the reference plane Lr at which the strength of the alternating magnetic field is smallest. With this arrangement, deterioration in strength of the magnetic field produced by the antenna coil 13 is satisfactorily prevented.

Next, an antenna module (RFID tag) according to a second preferred embodiment of the present invention is described in detail with reference to FIG. 5A and FIG. 5B. The RFID tag 5 of FIG. 5A is different from the RFID tag 1 of FIG. 3A in that the RFID tag 5 preferably includes four pad electrodes 51a to 51d in place of the terminal electrodes 19a, 19b. There is no other difference. Thus, in FIG. 5A, elements corresponding to the elements of FIG. 3A are referred to using the same reference marks, and the description thereof is herein omitted. Note that, in FIG. 5A, the rectifier circuit 17 is an inductive circuit.

The pad electrodes 51a to 51d are preferably formed inside the opening region α1 by printing, for example, using an electrically-conductive material so as to have a rectangular or substantially rectangular shape. Particularly, the pad electrode 51a is configured so as to be electrically coupled between the node N1 and the electronic component 17b and is capacitively coupled to a portion of the conductor pattern 13a which is closely adjacent to the pad electrode 51a. The pad electrodes 51b, 51c are arranged at the tip ends of wiring patterns drawn out from one and the other terminals of the electronic component 17h and are capacitively coupled to a portion of the conductor pattern 13a which is closely adjacent to the pad electrodes 51b, 51c. The pad electrode 51d is arranged at the tip end of a wiring pattern drawn out from one terminal of the electronic component 17a and is capacitively coupled to a portion of the conductor pattern 13a which is closely adjacent to the pad electrode 51d.

Here, FIG. 5B is an equivalent circuit of the RFID tag 5 of FIG. 5A. In FIG. 5B, the conductor pattern 13a is a portion enclosed by a broken line box. In the equivalent circuit, it generates inductances L1 to L4. Note that the conductor pattern 13b is shown as an inductance L5. Capacitances C1 to C4 are produced by coupling of the pad electrodes 51a to 51d and the conductor pattern 13a. In the equivalent circuit, the capacitances C1 to C4 are coupled in parallel to the inductances L1 to L4.

As described above, the pad electrodes 51a to 51d are arranged so as to be capacitively coupled to the antenna coil 13, so that the self-resonant frequency of the antenna coil 13 decreases. As a result, it is possible to decrease the length of the antenna coil 13. Due to this feature, the loss caused by the conductor pattern 13a decreases, and therefore, the antenna coil 13 which has excellent characteristics is obtained.

Since the pad electrodes 51a to 51d are capacitively coupled to the antenna coil 13, even if ESD (Electro-Static Discharge) is added to any of the pad electrodes 51a to 51d, the ESD is released to the antenna coil 13 via the capacitive coupling. Due to this feature, direct application of the ESD to a chip component which has low ESD tolerance, such as the IC chip 21, is prevented. Further, the pad electrodes 51a, 51d are provided between the opposite ends of the antenna coil 13 and the rectifier circuit 17. Analog signals are detected by the pad electrodes 51a, 51d, while digital signals are detected by the pad electrodes 51b, 51c.

Next, a variation of the antenna module (RFID tag) according to the second preferred embodiment of the present invention is described in detail with reference to FIG. 6A and FIG. 6B. A RFID tag 5' of FIG. 6A is different from the RFID tag 5 of FIG. 5A in that the RFID tag 5' includes a pad electrode 51d' in place of the pad electrode 51d. There is no other difference. Thus, in FIG. 6A, elements corresponding to the elements of FIG. 5A are referred to using the same reference marks, and the description thereof is herein omitted. Note that, in FIG. 6A, the rectifier circuit 17 is a capacitive circuit.

The pad electrode 51d' is preferably formed inside the opening region α1 by printing, for example, using an electrically-conductive material so as to have a rectangular or substantially rectangular shape. Particularly, the pad electrode 51d' is configured so as to be electrically coupled between the node N2 and the electronic component 17a and is capacitively coupled to a portion of the conductor pattern 13a which is closely adjacent to the pad electrode 51d'.

Here, FIG. 6B is an equivalent circuit of the RFID tag 5' of FIG. 6A. In FIG. 6B, the conductor pattern 13a is a portion enclosed by a broken line box. In the equivalent circuit, inductances L1 to L4 are generated. Note that the conductor pattern 13b is shown as an inductance L5. Capacitances C1 to C4 are produced by coupling of the pad electrodes 51a, 51b, 51c, and 51d' and the conductor pattern 13a. The capacitance C1 is coupled in parallel to the inductance L1 in the equivalent circuit. The capacitance C2 is coupled in parallel to a circuit consisting of L1, L2, and C1 in the equivalent circuit. The capacitance C3 is coupled in parallel to a circuit including L3, L4, and C4 in the equivalent circuit. The capacitance C4 is coupled in parallel to the inductance L4 in the equivalent circuit.

With the above-described configuration, the RFID tag 5' according to the variation provides the same functions and effects as those of the RFID tag 5 according to the second preferred embodiment.

Figure 7A:
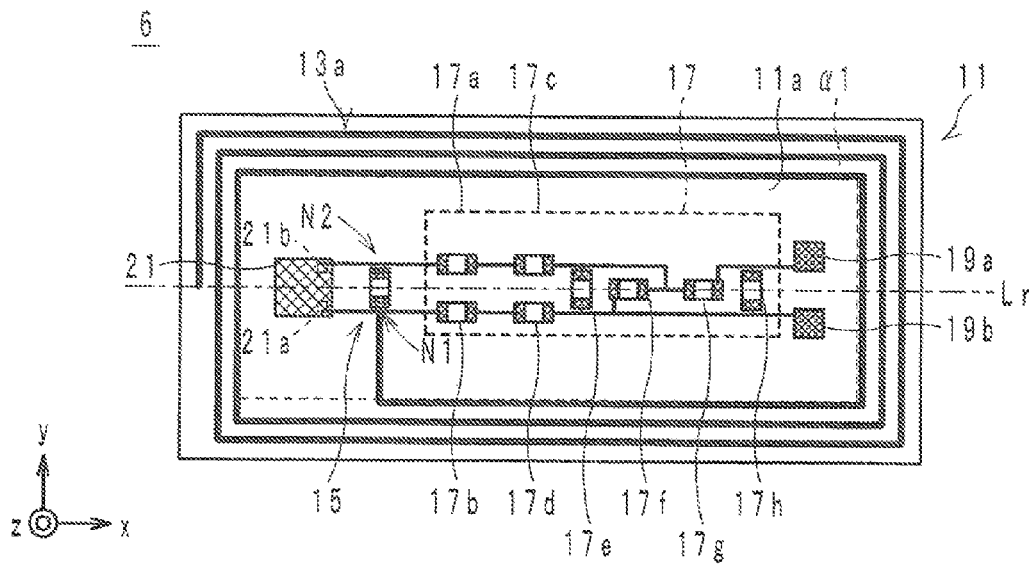
FIG. 7A is a top view showing a configuration of a RFID tag according to a third preferred embodiment of the present invention.
Figure 7B:
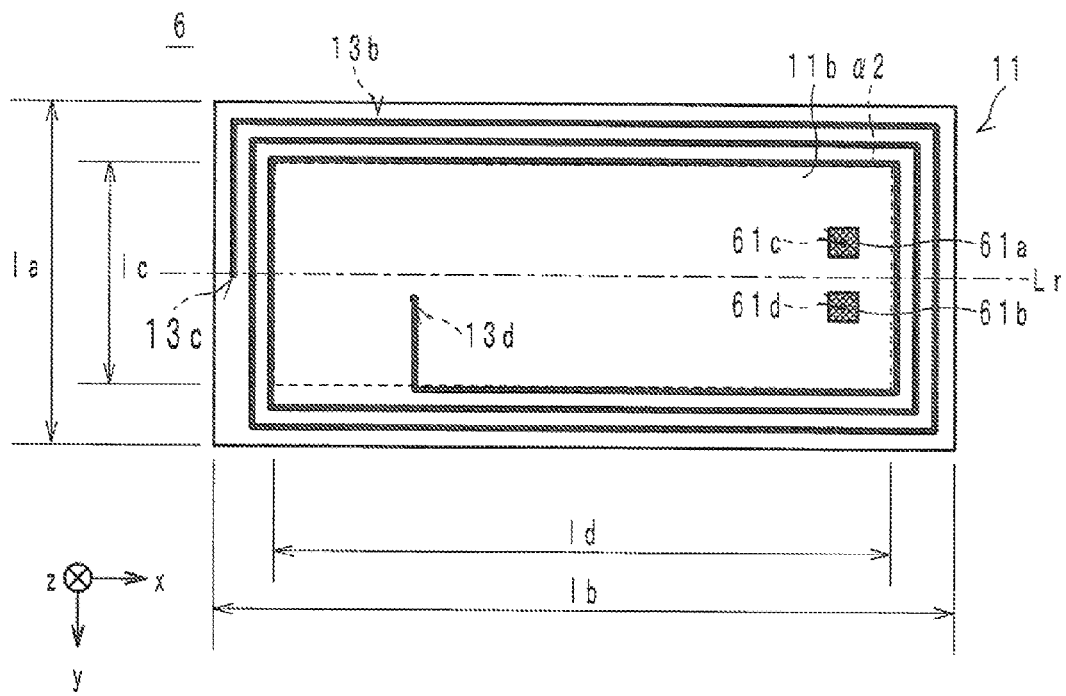
FIG. 7B is a bottom view showing a configuration of the RFID tag of FIG. 7A.

Next, an antenna module (RFID tag) according to a third preferred embodiment of the present invention is described in detail with reference to FIG. 7A and FIG. 7B. The RFID tag 6 of FIG. 7A and FIG. 7B is different from the RFID tag 1 of FIG. 3A and FIG. 3B in that the RFID tag 6 further includes terminal electrodes 61a, 61b and via conductors 61c, 61d. There is no other difference. Thus, in FIG. 7A and FIG. 7B, elements corresponding to the elements of FIG. 3A and FIG. 3B are referred to using the same reference marks, and the description thereof is herein omitted.

The terminal electrodes 61a, 61b are made of an electrically-conductive material, such as copper. The terminal electrodes 61a, 61b are arranged on the mounting surface 11b so as to substantially overlap the terminal electrodes 19a, 19b when viewed in plan from the z-axis direction.

The via conductor 61c penetrates through the base 11 so as to electrically couple the terminal electrode 19b and the terminal electrode 61a. The via conductor 61d penetrates through the base 11 so as to electrically couple the terminal electrode 19a and the terminal electrode 61b.

Figure 8A:
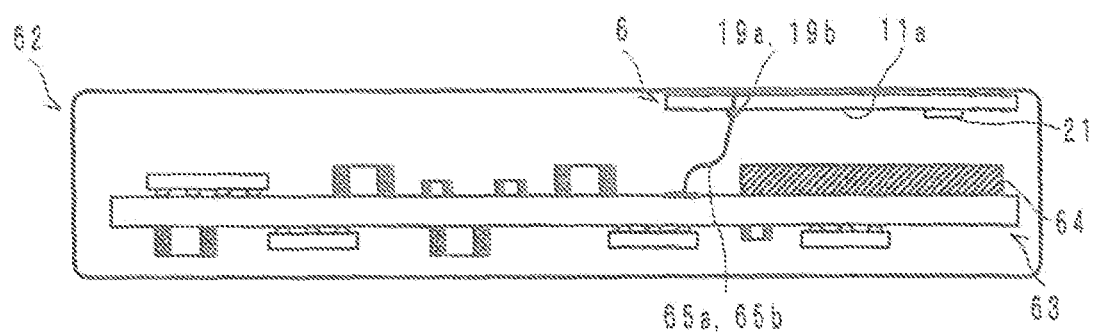
FIG. 8A is a schematic diagram showing the first example of a mobile terminal device including the RFID tag according to the third preferred embodiment of the present invention.
Figure 8B:
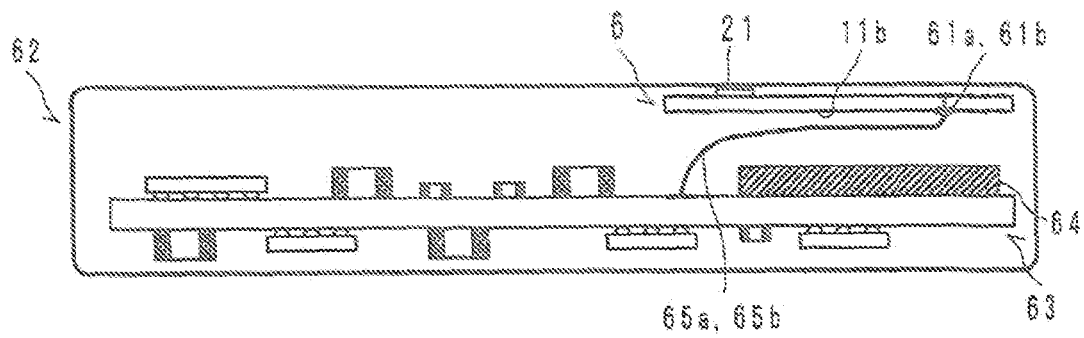
FIG. 8B is a schematic diagram showing the second example of a mobile terminal device including the RFID tag according to the third preferred embodiment of the present invention.

The RFID tag 6 that has the above-described configuration is preferably contained inside a mobile terminal device 62, such as a smartphone, for example, and is coupled to a voltage measuring circuit (not shown) provided in an electronic circuit board 63 inside the mobile terminal device 62 via, for example, two lead wires 65a, 65b, as shown in FIG. 8A and FIG. 8B. In the example of FIG. 8A, the mounting surface 11a of the RFID tag 6 opposes the electronic circuit board 63 with a battery pack 64 interposed therebetween. In this case, the lead wires 65a, 65b are coupled to the terminal electrodes 19a, 19b using solder or the like. On the other hand, in the example of FIG. 8B, the mounting surface 11b of the RFID tag 6 opposes the electronic circuit board 63 with the battery pack 64 interposed therebetween. In this case, the lead wires 65a, 65b are coupled to the terminal electrodes 61a, 61b using solder or the like.

As described above, the mounting surface 11b is provided with the terminal electrodes 61a, 61b that are electrically coupled to the terminal electrodes 19a, 19b via the via conductors 61c, 61d. With this feature, as shown in FIG. 8A and FIG. 8B, the RFID tag 6 preferably is connected to the electronic circuit board 63 using the elements provided on the mounting surface 11a side or, alternatively, using the elements provided on the mounting surface 11b side. Thus, according to the present preferred embodiment, the flexibility improves in terms of the connection of the RFID tag 6 to an external circuit.

In the example of FIG. 8B, the lead wires are soldered on the mounting surface 11b side. Therefore, heat produced in soldering is unlikely to be transmitted to the IC chip 21 that is mounted on the mounting surface 11a side as compared with the example of FIG. 8A. This arrangement enables protection of the IC chip 21 from high temperature heat. Note that, from the viewpoint of protection from high temperature heat, it is preferred that the distance in the x-axis direction between the IC chip 21 and the terminal electrodes 61a, 61b is as large as possible.

When the casing of the mobile terminal device 62 is capable of being disassembled into two parts by a cover, the RFID tag 6 can be connected to the electronic circuit board 63 after having been adhered to the cover. As described herein, according to the RFID tag 6, various procedures and methods can be used for connection to the electronic circuit board 63.

Figure 9A:
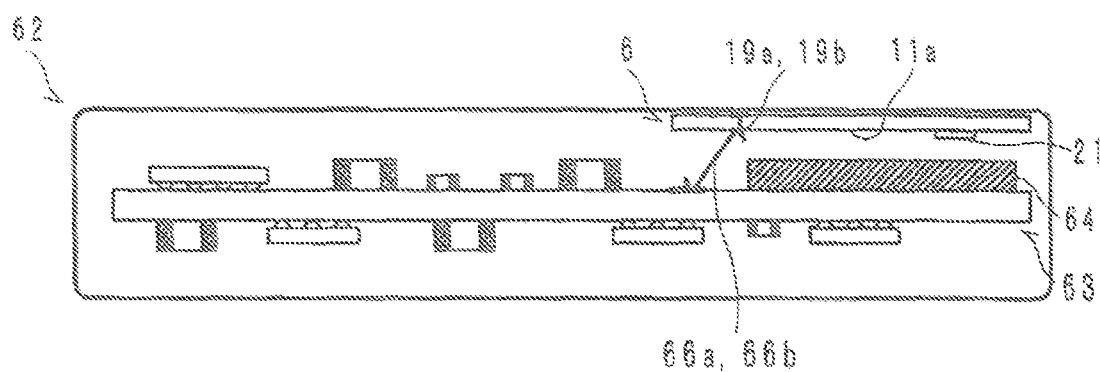
FIG. 9A is a schematic diagram showing another configuration example of the mobile terminal device of FIG. 8A.
Figure 9B:
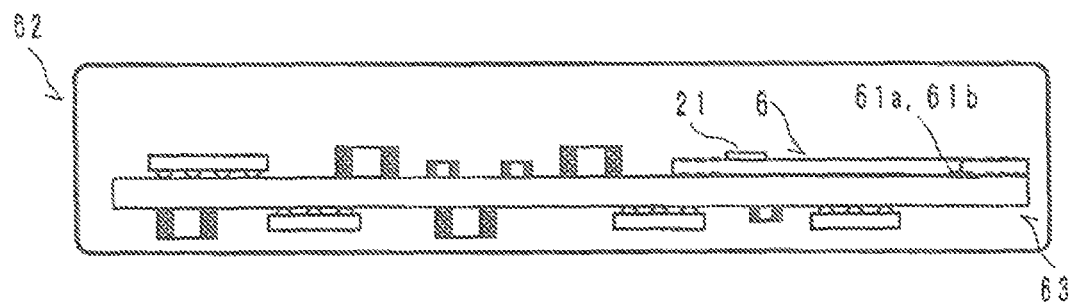
FIG. 9B is a schematic diagram showing another configuration example of the mobile terminal device of FIG. 8B.

In the above-described preferred embodiment, the RFID tag 6 is connected to the electronic circuit board 63 via the lead wires 65a and 65b. However, the present invention is not limited to this example. The RFID tag 6 and the electronic circuit board 63 may be electrically connected to each other via spring pins 66a and 66b as shown in FIG. 9A or may be directly joined to each other as shown in FIG. 9B, for example.

Figure 10:
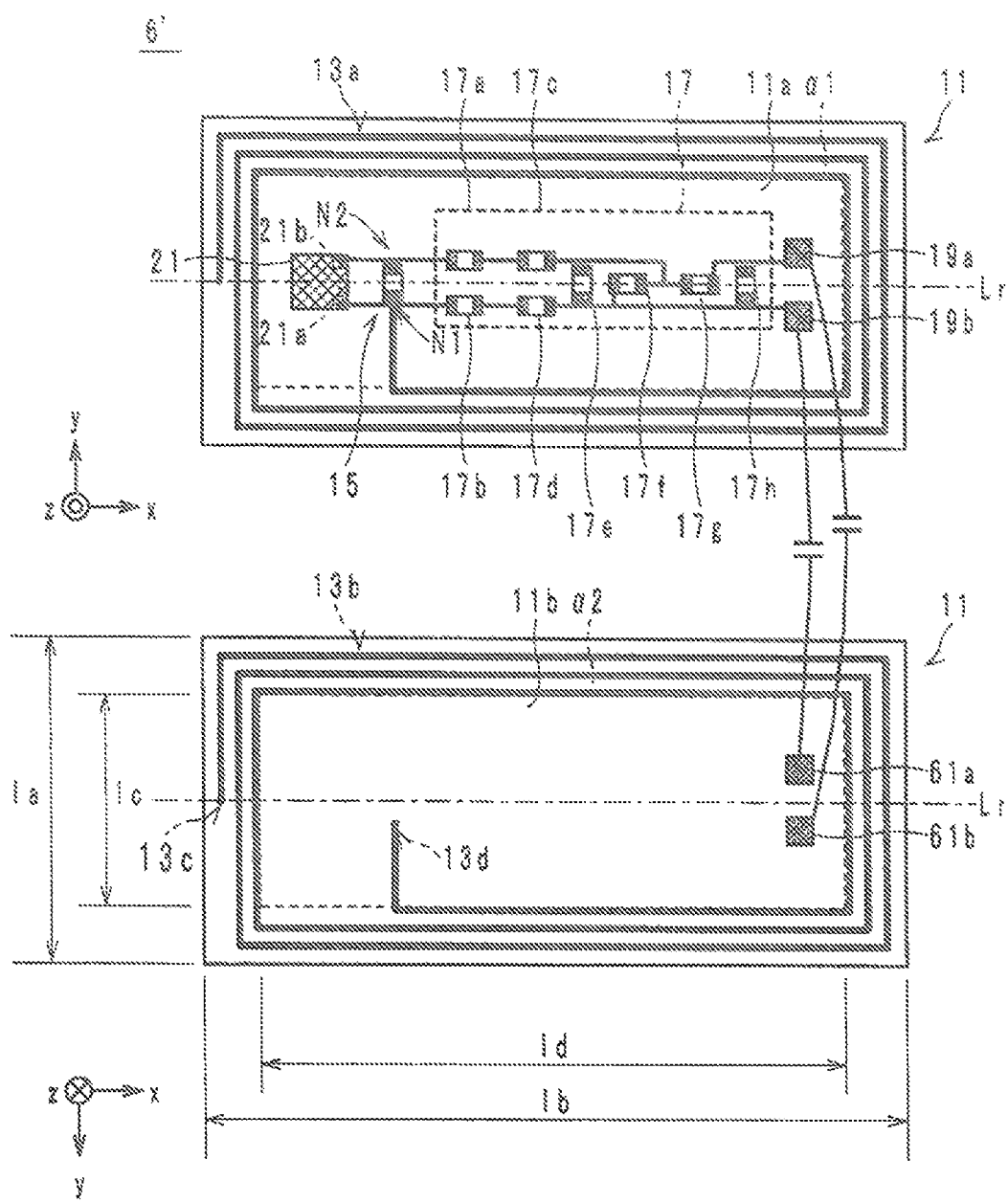
FIG. 10 is a diagram showing a variation of the RFID tag according to the third preferred embodiment of the present invention.

Next, an antenna module (RFID tag) according to a variation of the third preferred embodiment of the present invention is described in detail with reference to FIG. 10. The RFID tag 6' of FIG. 10 is different from the RFID tag 1 of FIG. 7A and FIG. 7B in that the via conductors 61c, 61d are not included, the terminal electrodes 19a, 61b generate a capacitance, and the terminal electrodes 19b, 61a generate a capacitance. There is no other difference. Thus, in FIG. 10, elements corresponding to the elements of FIG. 7A and FIG. 7B are referred to using the same reference marks, and the description thereof is herein omitted.

With the above-described configuration, the RFID tag 6' provides the same functions and effects as those of the RFID tag 6 according to the third preferred embodiment.

Figure 11:
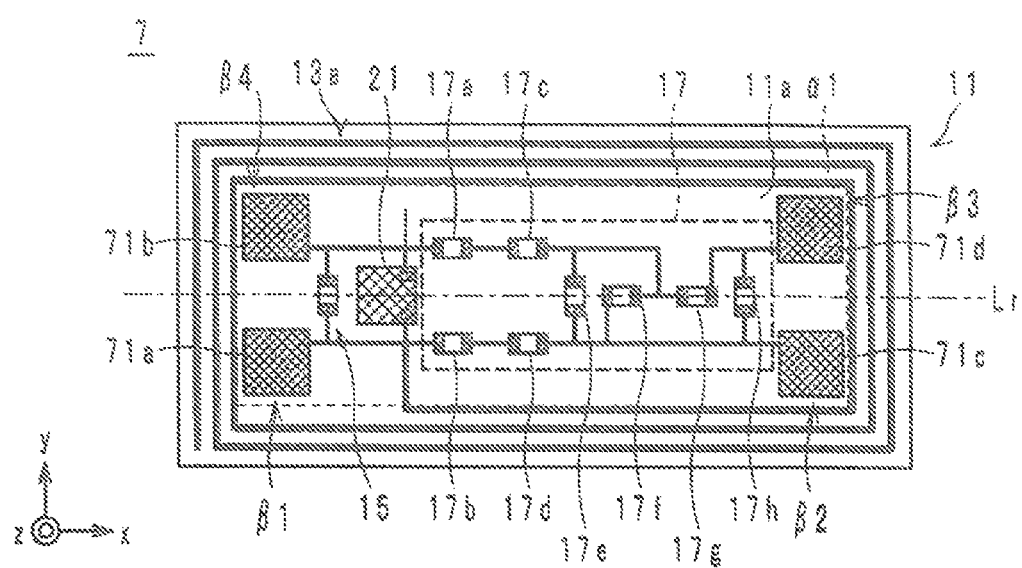
FIG. 11 is a top view showing a configuration of a RFID tag according to a fourth preferred embodiment of the present invention.

Next, an antenna module (RFID tag) according to a fourth preferred embodiment of the present invention is described in detail with reference to FIG. 11. The RFID tag 7 of FIG. 11 is different from the RFID tag 1 of FIG. 3A in that the RFID tag 7 includes four terminal electrodes 71a to 71d in place of the terminal electrodes 19a, 19b. There is no other difference. Thus, in FIG. 11, elements corresponding to the elements of FIG. 3A are referred to using the same reference marks, and the description thereof is herein omitted. Note that the configuration of the RFID tag 7 on the second mounting surface side is the same as that shown in FIG. 3B, and therefore, illustration thereof is omitted.

The terminal electrodes 71a to 71d are preferably formed inside the opening region α1, at the corners β1 to β4 of the opening region α1, by printing, for example, using a metal material so as to have a rectangular or substantially rectangular shape. Here, these terminal electrodes 71a to 71d are provided with a gap so as not to be in contact with the conductor pattern 13a. The terminal electrodes 71a, 71b are arranged at the tip ends of wiring patterns drawn out from one and the other terminals of the capacitor 15. The terminal electrodes 71c, 71d are arranged at the tip ends of wiring patterns drawn out from one and the other terminals of the electronic component 17h.

If a common RFID tag which does not include the terminal electrodes 71a to 71d is approached by another metal element or another antenna, the strength distribution of a magnetic field produced from an antenna coil included in this RFID tag is disturbed by the approaching metal element or antenna. As another antenna approaches, the inductance value of the antenna coil varies due to unwanted magnetic field coupling and, as a result, the resonant frequency of the resonance circuit deviates. If another metal element approaches to block the magnetic field from the antenna coil, the magnetic field of the antenna coil can be canceled, in some cases, by a magnetic field in the opposite direction which is generated by the effects of eddy currents. When the magnetic field from the antenna coil is canceled, a so-called null point can occur in some cases. Because of these circumstances, there is a problem that the communication distance of the RFID tag 7 deteriorates.

To solve such a problem, according to the fourth preferred embodiment, metal terminal electrodes 71a to 71d are provided at the corners β1 to β4. In general, as the RFID tag becomes closer to the antenna on the RWU side, the magnetic field coupling becomes stronger. Accordingly, the L value increases, and the resonant frequency becomes lower. On the other hand, when the terminal electrodes of the RFID tag are sufficiently large, eddy currents occur due to coupling with the antenna on the RWU side. Accordingly, the L value decreases, and the resonant frequency becomes higher. By utilizing this phenomenon, the terminal electrodes are arranged in the vicinity of the inside perimeter edge of the antenna coil of the RFID tag such that variation of the resonant frequency is prevented. However, this arrangement has the demerit of reducing the opening area of the antenna coil. In view of such, the terminal electrodes are preferably arranged at the four corners at which the magnetic field strength is highest inside the antenna coil, such that the effect of preventing the variation of the resonant frequency which is provided by the terminal electrodes is maximized while minimizing the reduction of the opening area of the antenna coil.

Figure 12A:
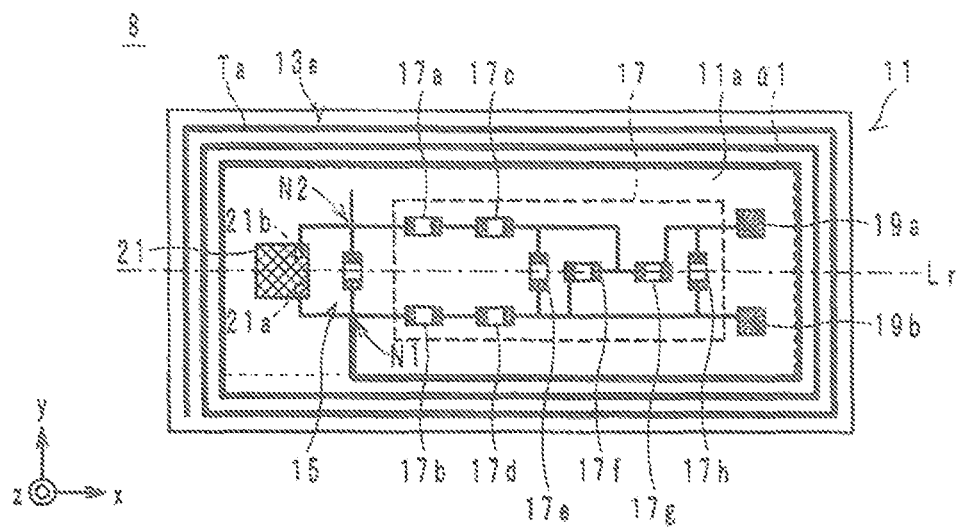
FIG. 12A is a top view showing a configuration of a RFID tag according to a fifth preferred embodiment of the present invention.
Figure 12B:
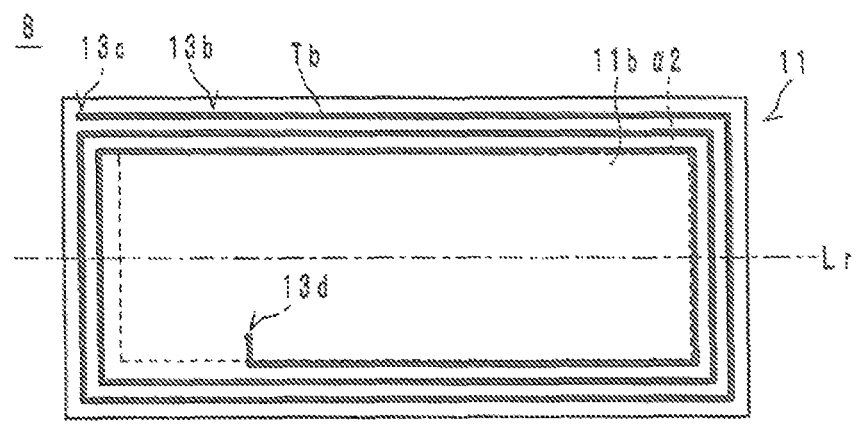
FIG. 12B is a bottom view showing a configuration of the RFID tag of FIG. 12A.

Next, an antenna module (RFID tag) according to a fifth preferred embodiment of the present invention is described in detail with reference to FIG. 12A and FIG. 12B. The RFID tag 8 of FIG. 12A and FIG. 12B is different from the RFID tag 1 of FIG. 3A and FIG. 3B in the points which will be described below. There is no other difference than the points described below. Thus, in FIG. 12A and FIG. 12B, elements corresponding to the elements of FIG. 3A and FIG. 3B are referred to using the same reference marks, and the description thereof is herein omitted.

In the fifth preferred embodiment, the elements are designed such that the midpoint of the current path extending from the terminal electrode 21a of the IC chip 21 and passing through the conductor pattern 13a, the via conductor 13c, the conductor pattern 13b, and the via conductor 13d to reach the terminal electrode 21b of the IC chip 21 lies on the outermost turn Ta of the conductor pattern 13a, the outermost turn Tb of the conductor pattern 13b, or the via conductor 13c.

According to the fifth preferred embodiment, in the antenna coil 13, the outermost turns Ta and Tb are portions which are likely to be touched by a human hand. Such portions which are likely to be touched by a human hand are the outermost turn Ta of the conductor pattern 13a, the outermost turn Tb of the conductor pattern 13b, or the via conductor 13c, which are the most distant from the IC chip 21. Thus, even if an energy which is capable of destroying the IC chip 21, such as ESD, is applied to portions of the antenna coil 13 which are likely to be touched by a human hand, the energy is attenuated by the conductor pattern 13a or the conductor pattern 13b before reaching the IC chip 21. This arrangement enables prevention of destruction of the IC chip 21 by the ESD.

In the above description of the preferred embodiments, the electronic components 17a to 17h that are constituents of the rectifier circuit 17 are mounted on the base 11. However, electronic components which are constituents of a matching circuit configured to provide impedance matching between the antenna coil 13 and the IC chip 21 may be mounted in place of the rectifier circuit 17 or in addition to the rectifier circuit 17.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna module comprising:
a base including two opposing mounting surfaces;
an antenna coil provided on or in the base so as to define an opening, the antenna coil having a shape that is symmetrical or substantially symmetrical with respect to a reference plane; and
an IC chip and a plurality of electronic components mounted on one of the mounting surfaces and electrically coupled to the antenna coil, the IC chip and the electronic components being arranged inside the opening when viewed in plan from a normal direction of the mounting surfaces; wherein
at least two of the plurality of electronic components are arranged so as to be symmetrical or substantially symmetrical to each other with respect to the reference plane when viewed in plan from the normal direction; and
the at least two of the plurality of electronic components that are arranged so as to be symmetrical or substantially symmetrical to each other with respect to the reference plane are surface-mounted electronic components and the at least two of the plurality of electronic components that are arranged so as to be symmetrical or substantially symmetrical to each other with respect to the reference plane are surface-mounted electronic components.

2. The antenna module according to claim 1, wherein each of the electronic components that are arranged so as to be symmetrical or substantially symmetrical to each other with respect to the reference plane is closer to the reference plane than to the antenna coil.

3. The antenna module according to claim 1, wherein the IC chip and at least another one of the plurality of electronic components are arranged on the reference plane when viewed in plan from the normal direction.

4. The antenna module according to claim 1, wherein the electronic components that are arranged so as to be symmetrical or substantially symmetrical to each other with respect to the reference plane are of the same type.

5. The antenna module according to claim 1, wherein
the plurality of electronic components define a rectifier circuit configured to rectify an electromotive force induced by the antenna coil; and
the antenna module further includes a terminal electrode electrically coupled to the rectifier circuit, the terminal electrode being provided on one of the mounting surfaces.

6. The antenna module according to claim 1, further comprising a pad electrode coupled to a circuit defined by the plurality of electronic components, the pad electrode being provided on one of the mounting surfaces and capacitively coupled to the antenna coil.

7. The antenna module according to claim 1, further comprising:
a first terminal electrode coupled to a circuit defined by the plurality of electronic components, the first terminal electrode being provided on one of the mounting surfaces; and
a second terminal electrode provided on the other mounting surface of the base so as to oppose the first terminal electrode with the base interposed therebetween.

8. The antenna module according to claim 7, further comprising a via conductor penetrating through the base from one to the other of the mounting surfaces and electrically coupling the first terminal electrode and the second terminal electrode.

9. The antenna module according to claim 1, wherein
the opening has a rectangular or substantially rectangular shape; and
the antenna module further includes a terminal electrode coupled to the IC chip and to a circuit defined by the plurality of electronic components, the terminal electrode being provided on one of the mounting surfaces, the terminal electrode being provided at at least one corner of the opening.

10. The antenna module according to claim 1, wherein the antenna coil includes:
a first conductor pattern provided near an outer edge of one of the mounting surfaces, one end of the first conductor pattern being coupled to one of terminal electrodes of the IC chip;
a via conductor penetrating through the base from one to the other of the mounting surfaces, one end of the via conductor being joined to the other end of the first conductor pattern; and
a second conductor pattern provided near an outer edge of the other mounting surface, one end of the second conductor pattern being coupled to the other end of the first via conductor, and the other end of the second conductor pattern being coupled to the other terminal electrode of the IC chip; wherein
a midpoint of a current path extending from one of the terminal electrodes of the IC chip and passing through the first conductor pattern, the via conductor, and the second conductor pattern to reach the other terminal electrode of the IC chip lies on an outermost turn of the first conductor pattern, an outermost turn of the second conductor pattern, or the via conductor.

11. An antenna module comprising:
a base;
an antenna coil provided on or in the base;
an IC chip electrically coupled to the antenna coil and provided on the base; and
a pad electrode coupled to the IC chip via a wiring pattern at a position away from a terminal electrode of the IC chip, the pad electrode being arranged on the base so as to be close to the antenna coil and be capacitively coupled thereto to reduce a self-resonance frequency of the antenna coil.

12. The antenna module according to claim 11, wherein
the base includes two opposing mounting surfaces;
the antenna coil defines an opening and has a shape that is symmetrical or substantially symmetrical with respect to a reference plane;
the IC chip is mounted on one of the mounting surfaces so as to be electrically coupled to the antenna coil and arranged inside the opening when viewed in plan from a normal direction of the mounting surface;
the antenna module further includes a plurality of electronic components mounted on one of the mounting surfaces, the electronic components being electrically coupled to the antenna coil, the electronic components being arranged inside the opening when viewed in plan from the normal direction of the mounting surface; and at least two of the plurality of electronic components are arranged so as to be symmetrical or substantially symmetrical to each other with respect to the reference plane when viewed in plan from the normal direction.

13. The antenna module according to claim 12, wherein each of the electronic components that are arranged so as to be symmetrical or substantially symmetrical to each other with respect to the reference plane is closer to the reference plane than to the antenna coil.

14. The antenna module according to claim 12, wherein the IC chip and at least another one of the plurality of electronic components are arranged on the reference plane when viewed in plan from the normal direction.

15. The antenna module according to claim 12, wherein the electronic components that are arranged so as to be symmetrical or substantially symmetrical to each other with respect to the reference plane are of the same type.

16. The antenna module according to claim 12, wherein
the plurality of electronic components define a rectifier circuit configured to rectify an electromotive force induced by the antenna coil; and
the antenna module further includes a terminal electrode electrically coupled to the rectifier circuit, the terminal electrode being provided on one of the mounting surfaces.

17. The antenna module according to claim 12, further comprising:
a first terminal electrode coupled to a circuit defined by the plurality of electronic components, the first terminal electrode being provided on one of the mounting surfaces; and
a second terminal electrode provided on the other mounting surface of the base so as to oppose the first terminal electrode with the base interposed therebetween.

18. The antenna module according to claim 17, further comprising a via conductor penetrating through the base from one to the other of the mounting surfaces and electrically coupling the first terminal electrode and the second terminal electrode.

19. The antenna module according to claim 12, wherein
the opening has a rectangular or substantially rectangular shape; and
the antenna module further includes a terminal electrode coupled to the IC chip and to a circuit defined by the plurality of electronic components, the terminal electrode being provided on one of the mounting surfaces and at least one corner of the opening.

20. The antenna module according to claim 12, wherein the antenna coil includes:
a first conductor pattern provided near an outer edge of one of the mounting surfaces, one end of the first conductor pattern being coupled to one of terminal electrodes of the IC chip;
a via conductor penetrating through the base from one to the other of the mounting surfaces, one end of the via conductor being joined to the other end of the first conductor pattern; and
a second conductor pattern provided near an outer edge of the other mounting surface, one end of the second conductor pattern being coupled to the other end of the first via conductor, and the other end of the second conductor pattern being coupled to the other terminal electrode of the IC chip; wherein
a midpoint of a current path extending from one of the terminal electrodes of the IC chip and passing through the first conductor pattern, the via conductor, and the second conductor pattern to reach the other terminal electrode of the IC chip lies on an outermost turn of the first conductor pattern, an outermost turn of the second conductor pattern, or the via conductor.

* * * * *